Patented Sept. 10, 1946

2,407,265

UNITED STATES PATENT OFFICE 2,407,265

COPPER COMPOUNDS OF MERCAPTANS DERIVED FROM TERPENES AND PROCESSES OF PRODUCING THEM

Arthur L. Fox, Woodstown, N. J., assignor to E. I. du Pont de Nemours & Company, Wilmington, Del., a corporation of Delaware No Drawing. Application April 23, 1942, Serial No. 440,253

15 Claims. (Cl. 260—438)

This invention relates to the preparation of organic copper compounds and more particularly to an improved process for producing copper compounds of mercaptans derived from terpenes.

It has recently been found that copper mercaptides derived from terpenes are excellent stabilizers for lubricating oils of the type usually employed in internal combustion engines. The addition of small amounts of these copper compounds to the lubricating oil employed in automobile and similar engines imparts a marked improvement in the oil condition and engine cleanliness after extended periods of use besides decreasing the bearing corrosion often experienced with oils that have been treated with other compounds. These copper mercaptides derived from terpenes have been found to be very soluble in mineral oils and hydrocarbon solvents such as benzene, hexane, and paraffin oil as well as in other solvents such as ether, alcohol, dioxane, etc., and while they impart a color to such solutions depending upon their purity, ranging from light yellow to red or brown they do not exhibit the strong tinctorial properties characteristic of many oil soluble copper compounds which color oils and solvents intense green, blue and purple colors that are unnatural in lubricating oils and therefore undesirable for use therein.

While metal mercaptides of certain terpene compounds have been described in the prior art the methods disclosed for their preparation are complicated and result in very low yields. Furthermore, these prior art processes are inapplicable or otherwise unsuitable for the preparation of the copper compounds of terpene mercaptans directly from the terpenes themselves.

It is therefore an object of this invention to provide a process for the preparation of copper compounds of mercaptans derived from terpenes by a simple, economical and commercially feasible process that employs readily available and relatively inexpensive raw materials. It is a further object of this invention to provide, as new compositions of matter, copper compounds of mercaptans derived from monocyclic terpenes.

According to the present invention monocyclic or bicyclic terpenes are heated with sulfur at temperatures sufficiently high to cause the formation of the terpene-sulfur complex which is then reacted with hydrogen under pressure in the presence of a sulf-active hydrogenation catalyst to effect a reduction of the complex to the mercaptan. The mercaptan is then reacted with a copper salt preferably in the presence of a reducing agent to give relatively high yields of a copper compound of the mercaptan derived from the terpene.

The temperature at which sulfurization of the terpene is effected may be varied within wide limits depending upon the reactivity of the terpene and the stability of the resulting sulfurized terpene. Some terpenes are more reactive than others and will sulfurize at a lower temperature, whereas some sulfurized terpenes are more unstable than others, being decomposed at high temperatures. In general temperatures of from 75° C. to 200° C. may be employed although temperatures of from 150° C. to 200° C. are preferred.

The hydrogenation of the terpene-sulfur complex is carried out with hydrogen in the presence of a catalyst, preferably under pressures of from 300 to 700 lbs. per sq. in. and at temperatures of from 100°–300° C. Higher pressures may advantageously be employed if suitable equipment is available. For batchwise operation pressures of from 20 to 300 atmospheres and temperatures of from 150 to 200° C. have been found to be suitable.

The catalysts employed may be any catalyst that is operable to effect hydrogenation in the presence of sulfur such as reduced nickel catalysts or the corrosion resistant sulf-active catalysts comprising the sulfides and polysulfides of metals of groups I, VI, and VIII of the periodic table. Typical examples of such catalysts which are effective in this reaction are the sulfides and polysulfides of cobalt, nickel, iron, molybdenum, tungsten, chromium, lead, palladium, tin and vanadium. The first four metal sulfides above mentioned are preferred because of their high activity. These catalysts are conveniently prepared by the methods more particularly described in copending applications of F. K. Signaigo, Ser. No. 319,240, filed September 16, 1940, Ser. No. 319,242, filed September 16, 1940, and the application of B. W. Howk, Ser. No. 333,936, filed August 23, 1940. Selection of the particular catalyst for the hydrogenation of the sulfurized terpene will depend upon the temperatures and pressures to be employed in the reaction for certain catalysts are more effective at certain temperatures than others. The catalyst may be employed in the massive state or deposited on supporting materials such as keiselguhr, pumice or activated charcoal. From 1 to 15 parts of catalyst in the form of finely divided powder may be employed for each 100 parts of sulfurized terpene compound to be hydrogenated.

The copperization of the mercaptans may be carried out by agitating a solution of the mercaptan with an aqueous solution of a cuprous salt at ordinary room temperatures or the temperatures attained during this reaction. While cupric salts such as cupric sulfate may be used, it is necessary in such case to employ a reducing agent in the reaction if high yields are to be obtained for the mercaptan first reduces the cupric salt to the cuprous salt with the mercaptan itself being oxidized to a disulfide, resulting in a materially reduced yield of the desired copper mercaptide. Since the presence of any cupric salt tends to lower the yield of the desired copper mercaptide it has been found advantageous to carry out the copperization of the mercaptan in the presence of a reducing agent, irrespective of what copper salt is employed. A preferred process of converting the mercaptan to the copper mercaptide is by employing an ammoniacal solution of cuprous chloride or cuprous acetate, to which has been added a reducing agent such as sodium hydrosulfite which will retain the copper in the cuprous state. The use of sodium hydrosulfite also has the further effect of reducing any terpene disulfide that may be present to the mercaptan, thereby preventing side reactions which would materially reduce the yield of the desired product.

The reaction of the terpene mercaptan with the copper salt may be carried out with the mercaptan dissolved in an excess of the terpene or in other solvents such as ether, benzene, toluene, ligroin, kerosene, lubricating oil, etc. After the reaction is complete the solvent layer of the copper mercaptide may be decanted from the aqueous layer and filtered to remove any traces of insoluble material. Where the copper mercaptide is to be isolated a volatile solvent is preferably employed which can be distilled off, whereby the copper mercaptide may be recovered in solid form. It is of course possible where other solvents such as the higher boiling hydrocarbons are employed to use such solutions of the copper mercaptide after proper washing and drying as concentrated solution for addition to the lubricating oils.

Where the sulfurized terpene is isolated and then subjected to hydrogenation the hydrogenation reaction may be carried out either with or without the addition of solvents. If solvents are employed in this step such as benzene, toluene, xylene, petroleum ether, ligroin, etc., the catalyst may be filtered from the resulting solution and the copperization carried out in the resulting organic solvent solution of the mercaptide without the addition of further solvent. Alcohols, ethers, such as dioxan and even non-solvents such as water may also be employed as the reaction medium in the hydrogenation step.

The sulfurization of the terpene and the catalytic reduction of the resulting terpene-sulfur complex may be carried out simultaneously by charging the terpene, sulfur and catalyst together in the autoclave and heating to 150°–200° C. under the hydrogenation pressure desired. The resulting solution of the mercaptan is filtered to eliminate the metal catalyst, and the solution of the copper salt and reducing agent is then mixed directly with the crude filtrate of the mercaptan derived from the terpene.

The copperization of the mercaptan is a substantially quantitative reaction and by the process as above described, where isolation of intermediates is made unnecessary, the over-all yield, based on the mercaptan originally employed is high. Where it is found to be advantageous, the solution of the mercaptan can be distilled and the isolated mercaptan dissolved in a solvent may then be reacted with the copper salt.

The following examples are given to illustrate the invention. The parts used are by weight.

*Example 1*

1756 parts of alpha-pinene (having a distilling range of from 156.2° C. to 157.7° C. with 90% distilling between 156.3° C. and 157.0° C., a refractive index of $N_{20}^D$ 1.4652 and a specific gravity of 0.8638) and 400 parts of sulfur are heated in an autoclave at 150° C. for 8 hours under autogenous pressure. The reaction mixture is cooled to room temperature and 75 parts of nickel catalyst are added. The mixture is then hydrogenated at 150° C. and under a hydrogen pressure of from 600 to 700 lbs. per sq. in. This reaction requires from 8 to 9 hours. The mixture is heated at 150° C. for one to two hours after the last pressure drop to ensure complete reaction. After cooling to room temperature, the catalyst is removed by filtration, and the crude mercaptan derived from the alpha pinene is fractionally distilled at 25 mm. pressure, giving an essentially pure mercaptan having a boiling range of 114.5–114.6° C. a refractive index of $N_{26}^D$ 1.5024 and a sulfur content of 18.87%. This distilled material on cooling to 0–5° C. for 24 hours, yields large, white crystals melting at 55.0° C. and a liquid fraction. After esterification with acetyl chloride in pyridine, the compound absorbs two atoms of iodine per molecule. Both the crystalline mercaptan and the liquid fraction show strong absorption bands at wave lengths of 14.00; 12.65; 11.55; 11.30; 11.00; 10.65; 10.45; 10.15; 9.90; 9.60; 9.30; 9.10; 8.90; 8.75; 8.40; 8.20; 7.95; 7.65; 7.30; 7.20; 6.80; and 6.00 microns, when examined by infrared light in accordance with the method used for determining infrared absorption as described in an article by W. H. Avery, entitled "Infrared spectrometer for industrial use," which appears in the J. Optical Soc. Am. 31, 633–638 (1941).

In a reaction vessel in which the air has been displaced with nitrogen, 13.4 parts of cuprous chloride are dissolved in 203 parts of 8.7% aqueous ammonia solution. Any blue color from cupric salts present in the cuprous chloride is removed by slowly adding a small quantity of a reducing agent such as sodium hydrosulfite. 20.8 parts of the distilled mercaptan having a boiling range of 114.5–114.6° C. derived from alpha-pinene as above described dissolved in 36 parts of ether (or low boiling naphtha) are added to the cuprous chloride solution and the mixture agitated for two hours under a nitrogen atmosphere. A reflux condenser or external cooling is preferably employed as the heat of reaction is often sufficient to vaporize a portion of the ether. The ether layer (upper) is decanted from the aqueous layer, (lower) and filtered to remove traces of insoluble material. This ether fraction is then evaporated under vacuum at room temperature, giving a quantitative yield of a copper mercaptide derived from alpha-pinene which is a bright yellow solid. The yield is based upon the mercaptan employed. The copper mercapide thus produced softens at 116° C. and melts at 122° C., it has a sulfur content of 13.75% and a copper content of 26.42%. The product is soluble in hydrocarbon solvents such as benzene, hexane, paraffin oil and in ether, alcohol, dioxane, etc.

Example 2

Where beta-pinene (having a distilling range of from 163.0° C. to 172.6° C. with 80% distilling between 164.0° C. and 167° C., a refractive index of $N_{20}^D$ 1.4750 and a specific gravity of 0.8714) is substituted in Example 1 for the alpha-pinene, a mercaptan is obtained having a boiling range of 111–113° C., a refractive index of $N_{26}^D$ 1.5044 and a sulfur content of 18.85%. The copper mercaptide derived from such beta mercaptan by the process above given melts at 81° to 83° C., it contains 13.86% sulfur and 23.94% copper.

Example 3

Where dipentene (having a distilling range of from 176.3° C. to 199.5° C. with 80% distilling between 177.5° C. and 181.7° C., a refractive index of $N_{20}^D$ 1.4728, an iodine number of 258 and a specific gravity of 0.8491) is substituted for the alpha-pinene of Example 1 and the crude mercaptan is fractionally distilled at 25 mm. pressure, an essentially pure mercaptan, having a boiling range of 118–119° C. a refractive index of $N_{26}^D$ 1.5188 and a sulfur content of 18.96% is obtained together with a higher boiling mercaptan containing two sulfur atoms, but only one mercaptan group per molecule which derivative has a boiling range of 152–162° C., a refractive index of $N_{26}^D$ 1.5459 and a sulfur content of 30.34%. When the mercaptan derived from dipentene as described above, having the boiling range of 152–162° C. is reacted with the copper salt as described in Example 1 a substantially quantitative yield of a copper mercaptide is obtained in the form of a bright yellow solid containing two sulfur atoms per atom of copper. This product melts at 109–110° C., and has a sulfur content of 21.70% and a copper content of 24.85%.

Example 4

Where terpinolene (having a distilling range of from 181.2° C. to 221.4° C. with 80% distilling between 182.8° C. and 193.4° C. and an iodine number of 290.9) substituted in Example 1 for alpha-pinene a mercaptan derived from terpinolene is obtained having a boiling range of 123–138° C., a refractive index of $N_{26}^D$ 1.5340 and a sulfur content of 19.08%. The copper mercaptide derived from this mercaptan by the process of Example 1 melts at 187° C. and contains 14.14% sulfur and 26.17% copper.

Example 5

Where menthene (having a distilling range of from 168.5° C. to 174.5° C. with 80% distilling between 169.1° C. and 170.5° C., a refractive index of $N_{20}^D$ 1.4526 and an iodine number of 208) is substituted in Example 1 for alpha-pinene, a mercaptan derived from menthene is obtained having a boiling range of 116–122° C., a refractive index of $N_{26}^D$ 1.4894 and a sulfur content of 18.48%. The copper mercaptide derived from this mercaptan by the process of Example 1, when further washed with alcohol melts at 60.0° C. and contains 13.76% sulfur and 25.52% copper.

Example 6

Where alpha-terpineol is substituted in Example 1 for alpha-pinene a mercaptan derived from alpha terpineol is obtained having a boiling range of 140–146° C., a refractive index of $N_{26}^D$ 1.5176 and a sulfur content of 18.12%. The copper mercaptide derived from this when further washed with petroleum ether melts at 90° C. and contains 14.87% sulfur and 25.42% copper.

Example 7

547 parts of camphene (having a distilling range of 157.3° C. to 160.1° C. with 80% distilling between 158.0° C. and 159.1° C., a refractive index of $N_{20}^D$ 1.4950, a freezing point of 37.9° C. and a specific gravity of 0.8366) and 249 parts of sulfur are heated in a steel autoclave, provided with agitation, at 150° C. for 10 hours under autogenous pressure. The condensation mixture is cooled to room temperature, and 40 parts of reduced nickel catalyst are added. The mixture then is hydrogenated at 150° C. and under a pressure of 600–700 lbs. per sq. in. until hydrogen absorption is complete as shown by absence of further pressure drops. After cooling, the crude product is filtered to remove the catalyst, and fractionally distilled at 25 mm. mercury pressure to obtain an essentially pure mercaptan with a boiling range of 115–118° C., a melting point of 44.5° C. and a sulfur content of 18.37%, and a higher boiling derivative having a boiling range of 122–123.5° C., which is liquid at ordinary temperatures and contains 18.85% of sulfur.

Example 8

The copper mercaptide of the mercaptan derived from camphene as described in Example 7 is prepared as in Example 1, employing the filtered crude mercaptan as derived above from the camphene prior to distillation. A major portion of the product is recovered by filtration of the ether phase at the finish of the coppering operation as a light yellow ether insoluble powder. This ether insoluble copper compound melts at 195° C., and has a sulfur content of 13.49% and a copper content of 26.49%. Evaporation of the ether filtrates yields a dark red resin which on trituration in 80 parts of dry acetone yields an ether soluble, acetone insoluble bright yellow powder which melts at 138° C. and has a sulfur content of 14.14% and a copper content of 26.22%.

Example 9

The copper mercaptide of the mercaptan derived from camphene as described in Example 7 having a boiling range of 115–118° C. at 25 mm. pressure, when prepared by the process of Example 1, melts at 186.0° C. and has a sulfur content of 13.62% and a copper content of 26.2%.

Example 10

The copper mercaptide of the mercaptan derived from camphene as described in Example 7 with a boiling range of 122–123.5% at 25 mm. pressure, when prepared by the process of Example 1, melts at 221° C. and has a sulfur content of 13.74% and a copper content of 26.2%.

Example 11

Instead of carrying out the sulfurization and hydrogenation as two distinct steps in the process these steps may be combined, for example in the following manner: 1088 parts of alpha-pinene of the quality described in Example 1, 256 parts of sulfur and 44 parts of a reduced nickel catalyst on diatomaceous earth, are charged into an autoclave and heated rapidly to 150° C. under approximately 500 lbs. per sq. in. hydrogen pressure. The mass is heated at this temperature for approximately 6 hours with the continual addition of hydrogen as the pressure drops to approximately 400 lbs. The temperature is then raised to 200° and heated for another 6 hrs. with the hydrogen pressure being maintained at between 400–500 lbs. per sq. in. When hydrogenation is substantially completed the pressure is released and the mass cooled to approximately 100° C. The charge is then filtered to remove the catalyst, giving a substantially colorless liquid, of which about 70% is a mercaptan as determined by an iodine titration. The mercaptan derived from pinene as above obtained is charged into 4000 parts of ammoniacal cuprous chloride solution made by reducing 1300 parts of $CuSO_4 \cdot 5H_2O$ with sodium sulfite in the presence of sodium chloride and dissolving the resulting $Cu_2Cl_2$ in ammonia. 585 parts of benzene are added and the reaction mass is stirred for a period of 3 hours. The benzene which contains the copper mercaptide in solution is then separated from the aqueous solution of the cuprous chloride and after being washed with water it is filtered and the benzene is distilled off under atmospheric pressure. 1000 parts of a light lubricating oil, such as SAE #10 is run into the still to dissolve the copper mercaptide of the alpha-pinene and after solution is effected it is filtered resulting in a clear, brownish-yellow oil having a copper content of approximately 8% and a sulfur content of about 5.5%. This product may be made up into a standard solution for use in lubricating oils for internal combustion engines.

In the above examples a low boiling naphtha, benzene, kerosene or other volatile substances may be employed in place of the ether where ether was used in the copperization step.

While in certain examples above given, the copper mercaptide is given an after-wash with acetone to remove any unreacted inert material, this wash may be omitted or other solvents may be employed which are not solvents for the copper mercaptide. The acetone or other solvent wash is of value when impure or unfractionated mercaptans are used. On decantation of the solvent layer of the copper mercaptide from the aqueous layer, the organic solution may be further washed with water to remove any water soluble material and the solvent then eliminated by distillation. The resulting isolated copper mercaptide may be employed in the solid form for addition to lubricating oils, or it may be dissolved in oils or solvents in high concentrations to be used as stock solutions for addition to oil that is to be used for lubricating engines.

In place of the specific terpenes mentioned in the examples the invention also contemplates the use of mixtures of terpenes such as those naturally occurring in pine oil, turpentine and camphor oils as well as those obtained as by-products in the synthetic process for manufacturing camphor.

It is of course understood that when the starting material contains a different ratio of isomers or impurities which form the copper mercaptides the resulting copper compounds may differ in their melting range from that given in the specific examples.

The copper compounds of mercaptans derived from monocyclic terpenes, irrespective of the process employed in the preparation of the terpene mercaptan, are new chemical compounds. The terpene mercaptans, employed in the preparation of such compounds, may be formed by processes other than those mentioned above, such as by the addition of hydrogen sulfide to an unsaturated bond of the monocyclic terpene in the presence of sulfuric acid, phosphoric acid or other catalyst as more particularly described in Patent 2,076,875 or by replacement of a halogen by the —SH group.

I claim:

1. In the process for preparing copper compounds of mercaptans derived from terpenes the steps which comprise heating the terpene with sulfur at temperatures sufficient to cause the formation of a terpene-sulfur complex, reducing this complex by reacting it with hydrogen under pressure in the presence of a hydrogenation catalyst to form the mercaptan and reacting the resulting mercaptan derived from the terpene with a copper salt.

2. In the process for preparing copper compounds of mercaptans derived from terpenes the steps which comprise heating the terpene with sulfur at temperatures sufficient to cause the formation of a terpene-sulfur complex, reducing this complex by reacting it with hydrogen under pressure in the presence of a hydrogenation catalyst to form the mercaptan and reacting the resulting mercaptan derived from the terpene with a copper salt under conditions whereby the copper salt is maintained in the cuprous state.

3. In the process for preparing copper compounds of mercaptans derived from terpenes wherein a terpene-sulfur complex is reduced to the mercaptan by a catalytic hydrogenation process, the step which comprises reacting the mercaptan derived from the terpene with a copper salt under conditions whereby the copper salt is maintained in the cuprous state.

4. The process of claim 3 wherein the mercaptan derived from the terpene is reacted with the copper salt without isolating it from the hydrogenation mass.

5. In the process for preparing copper compounds of mercaptans derived from terpenes wherein a terpene-sulfur complex is reduced to the mercaptan by a catalytic hydrogenation process, the step which comprises separating out the catalyst from the mercaptan solution and adding the mercaptan dissolved in an organic solvent to an ammoniacal solution of cuprous chloride which contains a reducing agent that will maintain the cuprous chloride in the cuprous state, agitating the mass until the mercaptan is converted to the copper mercaptide, and isolating the solvent solution of the mercaptide.

6. The process of claim 5 wherein the organic solvent employed is a volatile solvent which can be readily distilled off to permit recovery of the copper mercaptide in solid form.

7. In the process for preparing copper compounds of mercaptans derived from terpenes, the step which comprises reacting a mercaptan derived from a terpene by the introduction of an —SH group into the terpene with a cuprous salt in the presence of a reducing agent capable of maintaining the copper salt in the cuprous state.

8. The process of claim 7 wherein the reducing agent is one that will reduce any terpene disulfide that may be present or formed in the reaction mass to the terpene mercaptan.

9. In the process for preparing copper compounds of mercaptans derived from terpenes, the step which comprises reacting a mercaptan derived from a terpene by the introduction of an —SH group into the terpene dissolved in a volatile organic solvent with an ammoniacal solution of a cuprous salt in the presence of sodium hydrosulfite.

10. In the process of preparing copper compounds of mercaptans derived from terpenes the steps which comprise heating the terpene with sulfur at temperatures of from about 150° C. to about 200° C. for sufficient time to form a terpene-sulfur complex, reducing this complex by reacting it with hydrogen under pressures of about 300 pounds per square inch to about 700 pounds per square inch at temperatures of from about 150° C. to about 200° C. in the presence of a hydrogenation catalyst to form the mercaptan and reacting the resulting mercaptan derived from the terpene with a copper salt under conditions whereby the copper salt is maintained in the cuprous state.

11. The copper compound of a mercaptan derived from a monocyclic terpene which compound is obtained by reacting a mercaptan derived from the terpene by the introduction of an —SH group into the terpene with a cuprous salt in the presence of a reducing agent capable of maintaining the copper salt in the cuprous state.

12. The copper compound of a mercaptan derived from a monocyclic terpene which compound is obtained by heating the terpene with sulfur at temperatures sufficient to cause the formation of a terpene-sulfur complex, reducing this complex by reacting it with hydrogen under pressure in the presence of a hydrogenation catalyst to form the mercaptan and reacting the resulting mercaptan derived from the terpene with a copper salt under conditions whereby the copper salt is maintained in the cuprous state.

13. The copper compound of a mercaptan derived from dipentene which compound is obtained by heating the dipentene with sulfur at temperatures sufficient to cause the formation of a dipentene-sulfur complex, reducing this complex by reacting it with hydrogen under pressure in the presence of a hydrogenation catalyst to form the mercaptan and reacting the resulting mercaptan derived from the dipentene with a copper salt under conditions whereby the copper salt is maintained in the cuprous state.

14. The copper compound of a mercaptan derived from terpinolene which compound is obtained by heating the terpinolene with sulfur at temperatures sufficient to cause the formation of a terpinolene-sulfur complex, reducing this complex by reacting it with hydrogen under pressure in the presence of a hydrogenation catalyst to form the mercaptan and reacting the resulting mercaptan derived from the terpinolene with a copper salt under conditions whereby the copper salt is maintained in the cuprous state.

15. The copper compound of a mercaptan derived from menthene which compound is obtained by heating the menthene with sulfur at temperatures sufficient to cause the formation of a menthene-sulfur complex, reducing this complex by reacting it with hydrogen under pressure in the presence of a hydrogenation catalyst to form the mercaptan and reacting the resulting mercaptan derived from the menthene with a copper salt under conditions whereby the copper salt is maintained in the cuprous state.

ARTHUR L. FOX.